US 8,935,385 B2

(12) United States Patent
Chang et al.

(10) Patent No.: US 8,935,385 B2
(45) Date of Patent: Jan. 13, 2015

(54) SYSTEM AND METHOD OF MULTIMODALITY-APPENDED RICH MEDIA COMMENTS

(75) Inventors: Chia-Yuan Chang, Taichung (TW); Ting-Han Huang, Taichung (TW); Kang-Wen Lin, New Taipei (TW); Juin-Yi Huang, Taipei (TW); Chia-Yi Wu, Taipei (TW); Yu-Chen Huang, Taipei (TW); Ching-Fan Chu, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 187 days.

(21) Appl. No.: 13/194,334

(22) Filed: Jul. 29, 2011

(65) Prior Publication Data
US 2012/0317173 A1 Dec. 13, 2012

(30) Foreign Application Priority Data

Jun. 9, 2011 (TW) .............................. 100120261 A

(51) Int. Cl.
*G06F 15/173* (2006.01)
*G06F 3/01* (2006.01)
*G06F 17/30* (2006.01)
*H04Q 9/00* (2006.01)

(52) U.S. Cl.
CPC .......... *G06F 3/017* (2013.01); *G06F 17/30032* (2013.01); *H04Q 9/00* (2013.01); *H04Q 2209/10* (2013.01)
USPC ........... 709/224; 709/203; 370/401; 345/810; 715/810; 704/260

(58) Field of Classification Search
USPC .......................................... 709/203; 370/401
See application file for complete search history.

(56) References Cited

U.S. PATENT DOCUMENTS

| 6,119,147 | A | 9/2000 | Toomey et al. |
| 7,636,365 | B2 * | 12/2009 | Chang et al. ................... 370/401 |
| 8,782,043 | B2 | 7/2014 | Chisholm et al. |
| 2002/0007276 | A1 * | 1/2002 | Rosenblatt et al. ........... 704/260 |
| 2003/0058284 | A1 * | 3/2003 | Toh et al. ....................... 345/810 |

FOREIGN PATENT DOCUMENTS

CN 101369381 A 2/2009

OTHER PUBLICATIONS

Office Action by Taiwan Intellectual Property Office issued on Apr. 14, 2014.
Chinese Office Action dated on Jul. 3, 2014.

* cited by examiner

*Primary Examiner* — Kyung H Shin
(74) *Attorney, Agent, or Firm* — Rabin & Berdo, P.C.

(57) ABSTRACT

A system of multimodality-appended rich media comments is provided. The system includes a server and an electronic device. The electronic device includes a network access module, at least one sensor and a processing unit. The network access module communicates with the server. The at least one sensor senses a user's behavior in a recording mode to obtain a sensing data. The processing unit performs an application to provide a source medium, wherein a rich media comment function of the application can be activated to provide multiple interactive objects for selection and then trigger the recording mode. The application uploads the sensing data to the server after the recording mode finishes. The server analyzes the sensing data and accordingly modifies the selected interactive object, combines the source medium with the modified interactive object into a rendered medium, and then delivers the rendered medium to the application.

14 Claims, 5 Drawing Sheets

SYSTEM AND METHOD OF MULTIMODALITY-APPENDED RICH MEDIA COMMENTS

This application claims the benefit of Taiwan application Serial No. 100120261, filed Jun. 9, 2011, the subject matter of which is incorporated herein by reference.

BACKGROUND OF THE INVENTION

1. Field of the Invention

The invention relates in general to a system and method of multimodality-appended rich media comments.

2. Description of the Related Art

Multi-media technology is a comprehensive electronic information technology, which has gained rapid growth and been widely used in various fields such as advertisement, art, education, entertainment, engineering, commerce and scientific research. Examples of the media used in the multi-media technology include texts, graphs, pictures, sound, animations and films. However, the current multi-media technology is more focused on the exchange of man-machine interactive information, and the technology in the exchange of information between different users is still not matured. Therefore, the users are still unable to conveniently exchange their opinions in an interactive manner through various multi-media contents.

SUMMARY OF THE INVENTION

The invention is directed to a system and method of multimodality-appended rich media comments. Through multimodality-appended rich media comments, the exchange of opinions between different users is made more convenient.

According to a first aspect of the present invention, a system of multimodality-appended rich media comments is provided. The system includes a server and an electronic device. The electronic device includes a network access module, at least one sensor and a processing unit. The network access module communicates with the server. The at least one sensor senses a user's behavior in a recording mode to obtain a sensing data. The processing unit performs an application to provide a source medium, wherein a rich media comment function of the application can be activated to provide multiple interactive objects for selection and then trigger the recording mode. The application uploads the sensing data to the server after the recording mode finishes. The server analyzes the sensing data and accordingly modifies the selected interactive object, combines the source medium with the modified interactive object into a rendered medium, and then delivers the rendered medium to the application or the database stored in the server.

According to a second aspect of the present invention, a method of multimodality-appended rich media comments is provided. The method is used in a system of multimodality-appended rich media which includes a server and an electronic device. The electronic device includes a network access module, at least one sensor and a processing unit. The network access module communicates with the server. The method of multimodality-appended rich media comments includes the following steps. An application is performed by the processing unit to provide a source medium. A rich media comment function of the application is activated to provide multiple interactive objects for selection. A recording mode is triggered, so that at least the sensor senses a user's behavior to obtain a sensing data. The sensing data is uploaded to the server by the application after the recording mode finishes. The sensing data is analyzed and the selected interactive object is accordingly modified by the server, and the source medium is combined with the modified interactive object into a rendered medium. The rendered medium is delivered to the application or the database stored in the server by the server.

The above and other aspects of the invention will become better understood with regard to the following detailed description of the preferred but non-limiting embodiment(s). The following description is made with reference to the accompanying drawings.

DETAILED DESCRIPTION OF THE INVENTION

According to the system and method of multimodality-appended rich media comments provided in the invention, a user's behavior is sensed and analyzed, and then rich media comments related to the user's behavior are appended to the source medium in a multimodal manner so that exchange of opinions between different users becomes more convenient and the content of the multi-media system becomes more versatile.

Figure 1:
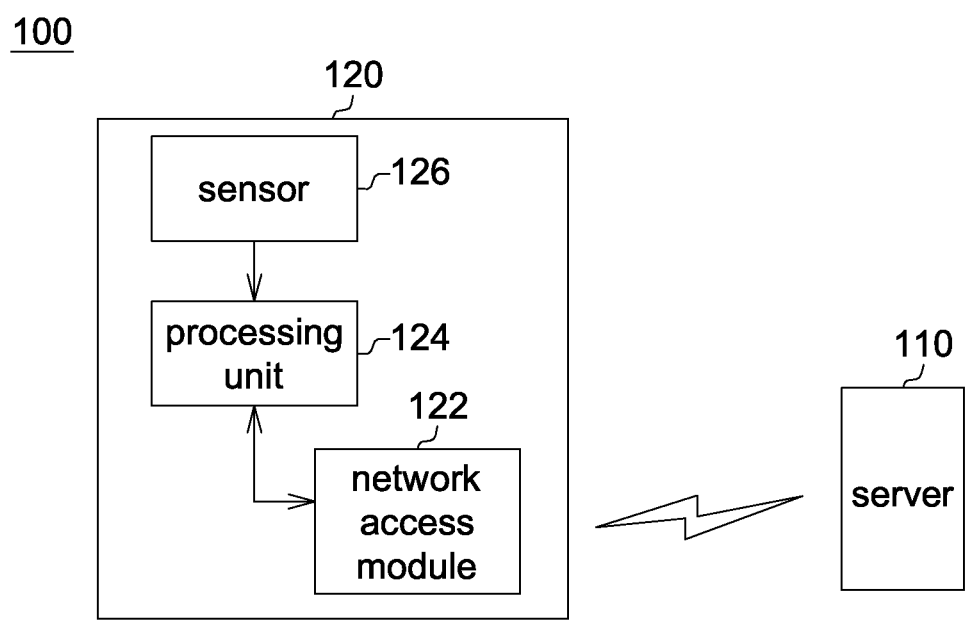
FIG. 1 shows a system of multimodality-appended rich media comments according to an embodiment of the invention.

Referring to FIG. 1, a system of multimodality-appended rich media comments according to an embodiment of the invention is shown. The system of multimodality-appended rich media comments 100 includes a server 110 and an electronic device 120. The electronic device 120 is such as a portable mobile device, but the invention is not limited to such exemplification. The electronic device 120 includes a network access module 122, a processing unit 124 and at least one sensor 126. The network access module 122 communicates with the server 110 through the network. The sensor 126 is such as a motion sensor, a location sensor, an image sensor or an audio sensor, but the invention is not limited to such exemplification.

Figure 2:
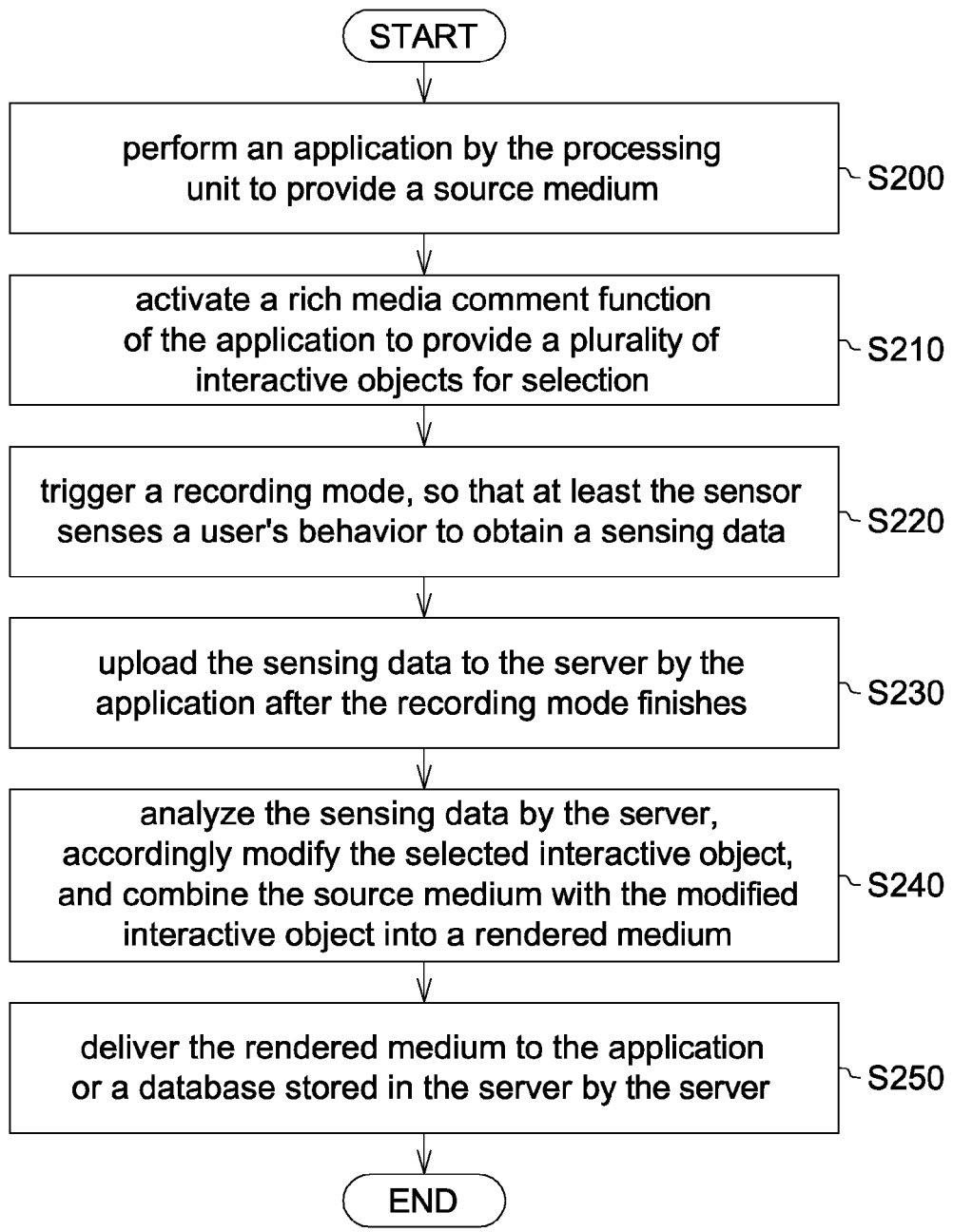
FIG. 2 shows a flowchart of a method of multimodality-appended rich media comments according to an embodiment of the invention.
Figure 3A:
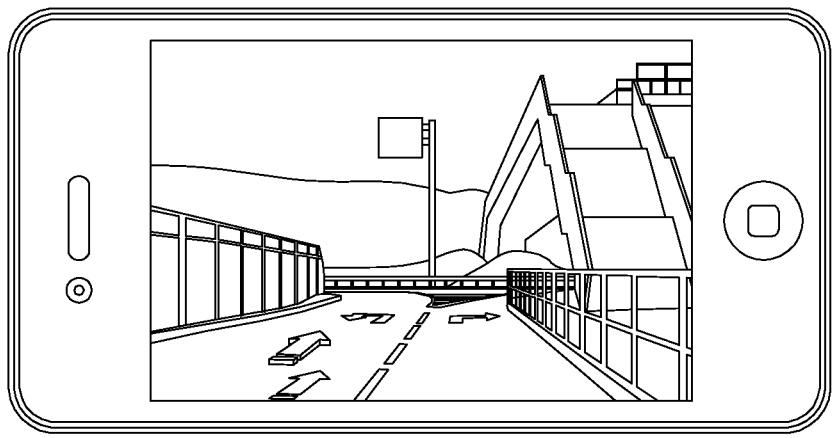
FIGS. 3A~3E are processes of multimodality-appended rich media comments according to an embodiment of the invention.

Referring to FIG. 2 and FIGS. 3A~3E. FIG. 2 shows a flowchart of a method of multimodality-appended rich media comments according to an embodiment of the invention. FIGS. 3A~3E are processes of multimodality-appended rich media comments according to an embodiment of the invention. It is noted that the exemplifications in FIGS. 3A~3E are for detailed descriptions only, not for limiting the invention. In step S200, an application is performed by the processing unit 124 to provide a source medium, such as a video frequency medium, an audio frequency medium, an article medium and a webpage medium. As indicated in FIG. 3A, a portable mobile device performs a browser to display a source medium such as a film from a You Tube website.

Figure 3B:
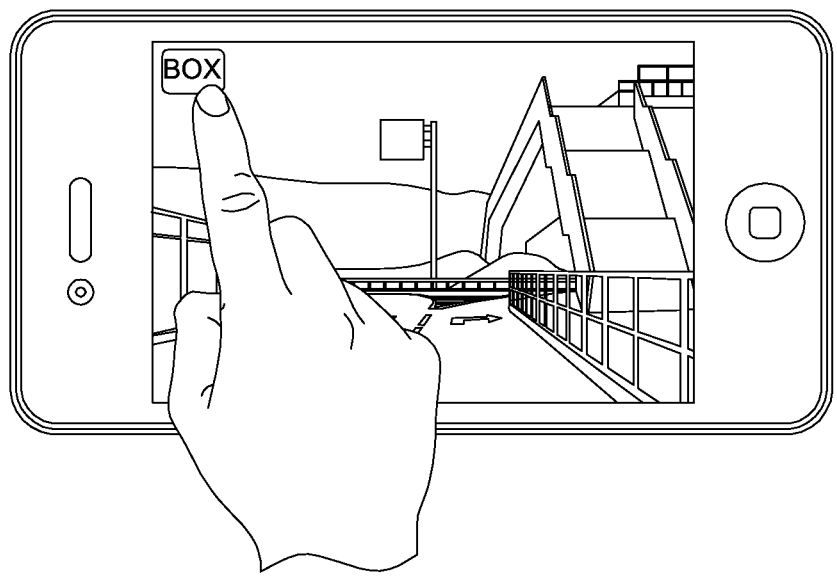
Figure 3C:
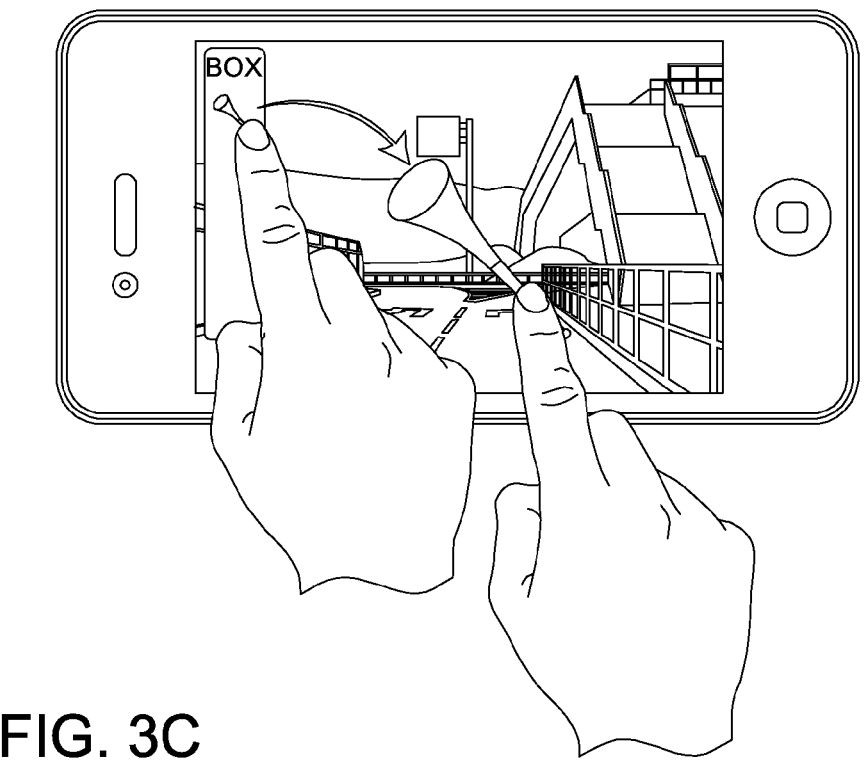

In step S210, a rich media comment function of the application is activated to provide multiple interactive objects for selection. As indicated in FIG. 3B, if the user is interested in a particular segment of the film and would like to make a note on it, then the rich media commenting function is activated to select one of the multiple interactive objects, wherein the selected interactive object is such as a vuvuzela as illustrated in FIG. 3C. In step S220, a recording mode is triggered, so that the sensor 126 senses a user's behavior to obtain a sensing data. In FIG. 3C, it is pre-set that the recording mode is triggered when the interactive object is dragged to the source medium by the user. However, the invention is not limited to such exemplification, and the setting can be based on actual needs.

Figure 3D:
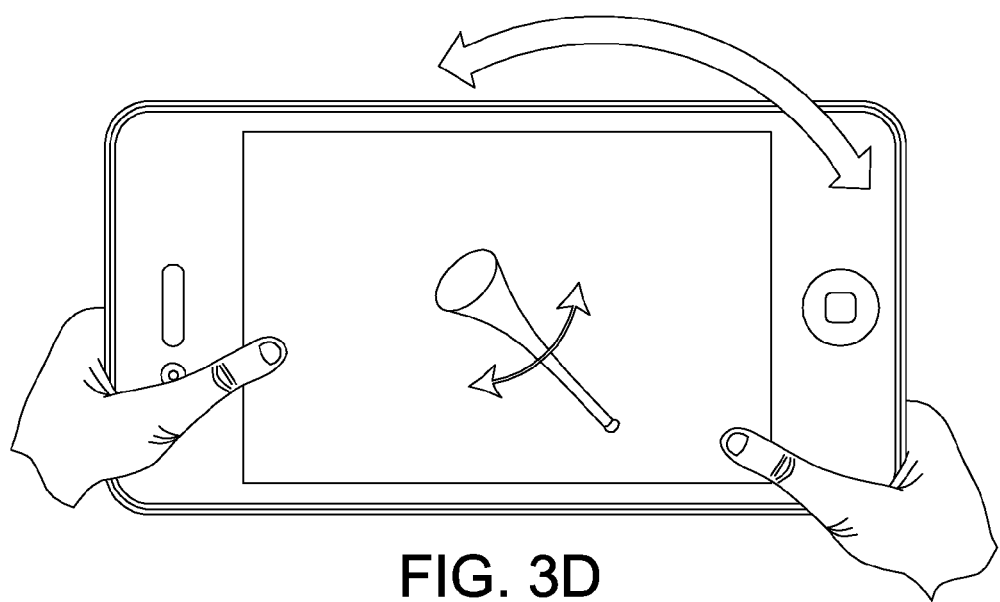
Figure 3E:
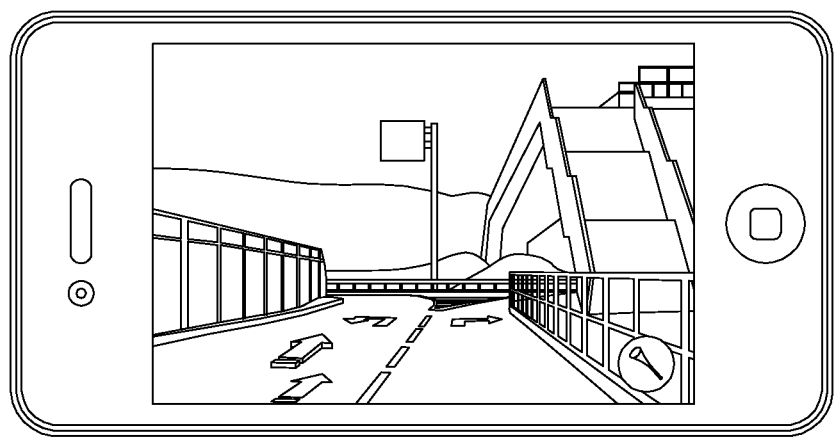

In FIG. 3D, the user's behavior is such as shaking the electronic device 120, and the sensor 126 accordingly records the information such as the start time, the duration, the amplitude or the frequency as sensing data. In step S230, the sensing data is uploaded to the server 110 by the application through the network access module 122 after the recording mode finishes. In step S240, the sensing data is analyzed by the server 110, the selected interactive object is accordingly modified, and the source medium is combined with the modified interactive object into a rendered medium. In step S250, the rendered medium is delivered to the application or the database stored in the server by the server 110. As indicated in FIG. 3E, the rendered medium is substantially formed by covering the source medium with the modified interactive object, wherein the modified interactive object does not interferes with the original content of the source medium.

In step S240, an environmental context related to the user is obtained by the server 110 by analyzing the received sensing data according to a particular algorithm and a situation factor is determined by interpreting the environmental context, wherein the situation factor is such as emotional or semantic expression or score. If the situation factor is an emotional expression, then the situation factor can be an emotion color or an emotion intensity. Attributes of the selected interactive object such as size, scale, frequency, sound, motion or color are modified by the server 110 according to the situation factor. Then, the source medium is covered with the modified interactive object by the server 110 to obtain a rendered medium.

Let the vuvuzela of FIG. 3C be taken for example. When other user performs an application to browse the rendered medium from the server 110, at the start time recorded in the corresponding sensing data, the rendered medium will display a vuvuzela. If the frequency of shaking recorded in the sensing data is too high, then the vuvuzela displayed on the rendered medium may have a large size, a higher audio frequency or a more exciting color such as red. Substantially, the server 110 collects and stores the identifier (ID) of the selected interactive object, the duration of the recording mode, the situation factor and the sensing data as a recorded information recorded in an XML format or other open standard format. Thus, the server 110 then delivers the rendered medium to various operating platform or software and is not subjected to a specific operating system.

In response to the community function which is very popular nowadays, the application may further filter the rendered medium according to a user preferred setting. For example, it can be pre-set that the application only receives the rendered medium containing the interactive object activated by a specific user group from the server 110 and neglects the rendered medium related to other users. Thus, the original source medium can be browsed completely and the comments the specific user group would like to express will not be interfered too much.

Figure 4:
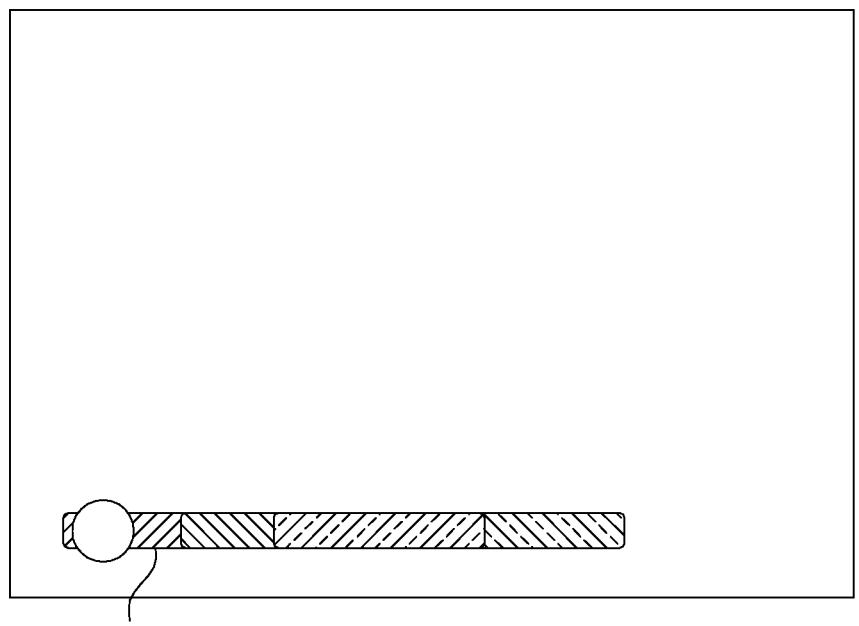
FIG. 4 shows a rendered medium with appended situation factor according to an embodiment of the invention.

In addition, the server 110 further combines the situation factor with the rendered medium according to a graphic format. Referring to Table 1 and FIG. 4. Table 1 is a correspondence table between environmental context and situation factor according to an embodiment of the invention. FIG. 4 shows a rendered medium with appended situation factor according to an embodiment of the invention.

TABLE 1

| Emotion Category | Emotion Color | Emotion Intensity |
|---|---|---|
| Excited/Surprised | Garnet | 3 |
|  | Red | 2 |
|  | Pink | 1 |
| Happy/Enjoyable | Orange | 3 |
|  | Yellow | 2 |
|  | Lemon Yellow | 1 |
| Smooth/Relaxed | Green | 3 |
|  | Olivine | 2 |
|  | Blue | 1 |

As indicated in FIG. 4, the server 110 can append the situation factor to the rendered medium in the graphic format such as an emotion color and a time bar 400, but the invention is not limited to such exemplification. In FIG. 4, the server 110 maps emotion colors to corresponding time points according to the emotion category and the emotion intensity. Thus, the user can easily catch other users' rich media comments on the rendered medium through the emotion color and the time bar, so that the user can select interesting parts for browsing.

According to the system and method of multimodality-appended rich media comments disclosed in the above embodiments of the invention, a user's behavior is sensed and analyzed and rich media comments related to user's behavior is appended to the source medium in a multimodal manner, so that interactive comments in a unique format are created, and the user's actions and attributes of interactive objects are combined to provide more practical feedback to facilitate the exchange of opinion between different users and make the content of the multi-media system more versatile.

While the invention has been described by way of example and in terms of the preferred embodiment(s), it is to be understood that the invention is not limited to such exemplification. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system of multimodality-appended rich media comments, comprising:
   a server; and
   an electronic device, comprising:
      a network access module for communicating with the server;
      a memory for storing instructions of an application;
      at least one hardware sensor for sensing a user's behavior in a recording mode to obtain sensing data; and
      a processing unit for executing the instructions of the application to provide a source medium, wherein a rich media comment function of the application can be activated to provide a plurality of interactive objects for selection and trigger the recording mode when a selected one of the interactive objects is dragged to the source medium, and the application uploads the sensing data to the server after the recording mode finishes;
   wherein, the server analyzes the sensing data and accordingly modifies the selected interactive object, combines the source medium with the modified interactive object into a rendered medium, and then delivers the rendered medium to the application or a database stored in the server;

wherein the server obtains a situation factor according to the sensing data, maps the situation factor to an emotion color illustrated at a plurality of points in time on a time bar, and appends the time bar to the rendered medium in a graphic format.

2. The system of multimodality-appended rich media comments according to claim 1, wherein the source medium is selected from among a video frequency medium, an audio frequency medium, an article medium and a webpage medium.

3. The system of multimodality-appended rich media comments according to claim 1, wherein the server analyzes the sensing data to obtain an environmental context, interprets the environmental context to determine the situation factor, and then modifies the selected interactive object according to the situation factor.

4. The system of multimodality-appended rich media comments according to claim 3, wherein the server modifies attributes of the selected interactive object selected from among size, scale, frequency, sound, motion and color according to the situation factor.

5. The system of multimodality-appended rich media comments according to claim 3, wherein the server collects the identifier of the selected interactive object, the duration of the recording mode, the situation factor and the sensing data as recorded information.

6. The system of multimodality-appended rich media comments according to claim 3, wherein the situation factor comprises an emotion category or an emotion intensity.

7. The system of multimodality-appended rich media comments according to claim 1, wherein the application further filters the rendered medium according to a user preferred setting.

8. A method of multimodality-appended rich media comments, wherein the method is used in a multimodality-appended rich media system comprising a server and an electronic device, the electronic device comprises a network access module, at least one sensor and a processing unit, the network access module communicates with the server, and the method of multimodality-appended rich media comments comprises:

performing an application by the processing unit to provide a source medium;

activating a rich media comment function of the application to provide a plurality of interactive objects for selection;

triggering a recording mode when a selected one of the interactive objects is dragged to the source medium, so that at least the sensor senses a user's behavior to obtain sensing data;

uploading the sensing data to the server by the application after the recording mode finishes;

analyzing the sensing data by the server, accordingly modifying the selected interactive object and combining the source medium with the modified interactive object into a rendered medium; and delivering the rendered medium to the application or a database stored in the server by the server;

wherein the server obtains a situation factor according to the sensing data, maps the situation factor to an emotion color illustrated at a plurality of points in time on a time bar, and appends the time bar to the rendered medium in a graphic format.

9. The method of multimodality-appended rich media comments according to claim 8, wherein the source medium is selected from among a video frequency medium, an audio frequency medium, an article medium and a webpage medium.

10. The method of multimodality-appended rich media comments according to claim 8, further comprising:

analyzing the sensing data by the server to obtain an environmental context and interpreting the environmental context to determine the situation factor; and modifying the selected interactive object by the server according to the situation factor.

11. The method of multimodality-appended rich media comments according to claim 10, further comprising:

modifying the attributes of the selected interactive object, the attributes selected from among size, scale, frequency, sound, motion and color by the server according to the situation factor.

12. The method of multimodality-appended rich media comments according to claim 10, further comprising:

collecting the identifier of the selected interactive object, the duration of the recording mode, the situation factor and the sensing data as a recorded information by the server.

13. The method of multimodality-appended rich media comments according to claim 10, wherein the situation factor comprises an emotion category or an emotion intensity.

14. The method of multimodality-appended rich media comments according to claim 8, further comprising:

filtering the rendered medium by the application further according to a user preferred setting.

* * * * *